United States Patent [19]

Suzuki et al.

[11] Patent Number: 4,542,970

[45] Date of Patent: Sep. 24, 1985

[54] SHUTTER RELEASE DEVICE

[75] Inventors: Ryoichi Suzuki, Kanagawa; Ryuji Tokuda, Tokyo, both of Japan

[73] Assignee: Canon Kabushiki Kaisha, Tokyo, Japan

[21] Appl. No.: 617,239

[22] Filed: Jun. 5, 1984

Related U.S. Application Data

[63] Continuation of Ser. No. 396,316, Jul. 8, 1982, abandoned.

[30] Foreign Application Priority Data

Jul. 15, 1981 [JP] Japan ................................ 56-110516

[51] Int. Cl.[4] .......................... G03B 3/10; G03B 17/40
[52] U.S. Cl. ................................ 354/400; 354/238.1; 354/268; 354/403
[58] Field of Search ................................ 354/400–409, 354/234.1, 235.1, 237, 239, 240, 238.1, 266, 267.1, 268

[56] References Cited

U.S. PATENT DOCUMENTS 4,313,662 2/1982 Kurei et al. .................. 354/238.1 X
4,350,418 9/1982 Taguchi et al. .............. 354/238.1 X
4,370,037 1/1983 Uchidoi et al. .............. 354/238.1 X

FOREIGN PATENT DOCUMENTS

22903 9/1980 Japan ................................ 354/238.1

Primary Examiner—William B. Perkey
Attorney, Agent, or Firm—Toren, McGeady, Stanger, Goldberg & Kiel

[57] ABSTRACT

A shutter release device designed so that at the time of the self-timer photographing, the self-timer circuit is operated by a depression of the shutter button which closes the switch associated with the shutter button, the self-timer circuit is made non-operative by closing the above switch with re-operation of the shutter button during the self-timer operation so that the shutter release operation can immediately be carried out.

12 Claims, 5 Drawing Figures

SHUTTER RELEASE DEVICE

This continuation of application Ser. No. 396,316, filed July 8, 1982, now abandoned.

BACKGROUND OF THE INVENTION

1. Field of the Invention

The present invention relates to a release device of a camera, particularly one which controls the release operation during self-timer operation.

2. Description of the Prior Art

It has been impossible for conventional mechanical self-timers to stop their operation in order to carry out the shutter release operation in the event that some change takes place in the circumstance of the subject during the operation of the self-timer. In the prior art, the release operation is suspended until the self-timer finishes the count operation. This defect of the conventional art often causes the shutter chance to be lost.

Recently, cameras with a built-in auto focusing device have become more popular. In these cameras, auto focusing is carried out only for a subject in the center of the picture frame. In view of these features, it has been proposed, as disclosed in the Japanese Patent Publication No. Sho 55-115022, that by making use of the delay operation of a self-timer mechanism, the first release operation is carried out in the set state of the self-timer. During their operation, the distance to the subject in the center of the picture frame is measured by an auto focusing mechanism, then the lens is driven and fixed at the in focus position, the subject is moved to a desired position in the picture frame, and the self-timer operation is stopped by carrying out the second release operation during the self-timer operation, allowing the shutter release operation to be carried out immediately. However, because of the complicated mechanism, these conventional arts have been confronted with practical impossibility due to high manufacturing cost.

SUMMARY OF THE INVENTION

Accordingly, it is an object of the present invention to provide an improved shutter release device which overcomes the disadvantages of prior art devices.

Another object of the present invention is to provide a shutter release device having a release circuit designed so the self-timer circuit operation begins with a depression of the shutter button which closes the switch associated with the shutter button. The self-timer circuit is made non-operative by closing the switch by a re-operation of the shutter button during the self-timer operation thereby permitting the shutter release operation to be immediately carried out.

A further object of the present invention is to provide a shutter release device designed so that misoperation of the switch due to the chattering is prevented and a correct release operation is always obtained by making the release circuit non-responsive to the closing of the release circuit switch during a certain determined time after the first release operation of the shutter button.

These and further objects and features of the present invention will become apparent from the following detailed description of embodiments with reference to the accompanying drawings.

DESCRIPTION OF THE PREFERRED EMBODIMENTS

Figure 1:
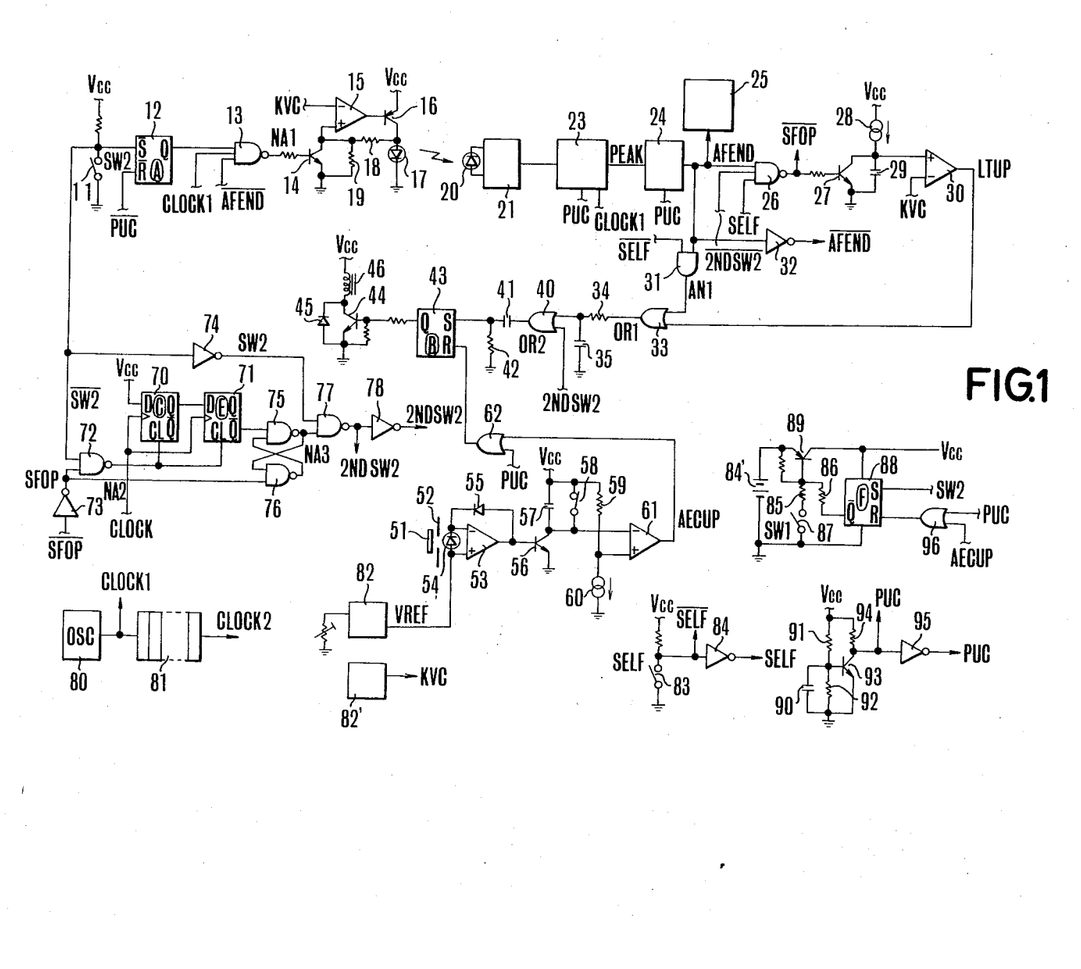
FIG. 1 shows an embodiment of the camera having a shutter release device of the present invention.

FIG. 1 shows an embodiment of the circuit of the present invention. The specification of the circuit is as follows:

(1) An automatic focusing device of the active system having an infrared light emitting diode is provided.
(2) An automatic exposure mechanism of an auxiliary light measuring system is provided.
(3) A program lens shutter which also acts as the diaphragm is used, and the shutter control magnet is of the attracting-holding type. When the magnet attracts the armature, the shutter opening operation starts; when the armature stops attracting the armature, the shutter closing operation starts.

In the drawing, 11 is the shutter release switch SW2 to be closed with the depression of the shutter button. 12 is the RS flip flop circuit (hereinafter called RS-FF), terminal $\bar{S}$ is connected to the voltage dividing point of the pull-up resistors to SW2, 11 and the power source Vcc and to whose reset terminal the power up clear bar ($\overline{PUC}$) signal is applied. 13 is a 3 input NAND gate, one input is connected to the Q output of RS-FF 12 and to the remaining two inputs the CLOCK 1 signal and the $\overline{AFEND}$ signal to be explained later are respectively applied. 14 is the NPN switching transistor connected to the output of 13 via a resistor and 15 is an OP amplifier to whose (−) input the standard voltage source KVC, to be explained later, is connected and to whose (+) input the collector of the above switching transistor 14 is connected. 16 is a PNP transistor connected to the output of OP amplifier 15. The emitter of 16 is connected to the power source Vcc, the base to the output of OP amplifier 15 and the collector to the anode of the infrared light emitting diode 17 (hereinafter called iRED). 18 and 19 are the resistors connected between the collector of PNP transistor 16 and the ground, and the voltage dividing point is connected to the (+) input of OP amplifier 15. iRED 17 is driven by a constant voltage with the negative feed back effect of OP amplifier 15. 20 is the photo voltaic element for sensing the light from the iRED which is reflected by the object; 21 is the amplifier for amplifying the output of 20; 23 is the conventional peak detecting circuit for detecting the peak value of the above amplifier 21; and 24 is the in-focus signal producing circuit (hereinafter called AFEND signal). 25 is the driving circuit for the conventional magnet and the AF magnet, this circuit interrupts the current supply to the AF magnet when the above AFEND signal is produced, so as to stop the movement of the lens barrel. 26 is the 3 input NAND gate, to one input of which the above AFEND signal is applied, and to the two other inputs of which the 2NDSW2 signal and the SELF signal are respectively connected. 27 is the NPN switching transistor, whose base is connected to the output $\overline{SFOP}$ of the above NAND gate 26 via a resistor. 28 is a constant current circuit and 29 is the time constant condenser connected in parallel to the above switching transistor 27. 30 is a comparator, whose (+) input is connected to the connecting point of the above condenser 29 with the constant current circuit 28. Further, to its (−) input the standard voltage KVC, to be explained later, is applied. 31 is a 2 input AND gate, to one input the output of the above AFEND signal producing circuit 24 is applied and to the other input the $\overline{\text{SELF}}$ signal, to be explained later, is applied. 32 is an inverting circuit connected to the output of the above AFEND signal producing circuit, 33 is a 2 input OR gate, one input of which is connected to output AN1 of the AND gate 31 and whose other input is connected to output LTUP of the above comparator 30. 34 and 35 indicate a resistor and a condensor constituting a delay circuit and 40 is a 2 input OR gate, one input of which is connected to the output of the above delay circuit (34, 35) and to whose other input the 2ND SW2 signal, to be explained below, is applied. 41 and 42 are a condenser and a resistor, constituting a differentiation circuit, the output of which is connected to the set input S of the RS-FF43.

The Q output of RS-FF 43 is connected to the base of NPN switching transistor 44 via a resistor and the collector of 44 is connected to the shutter control magnet 46. 45 is a Zenner diode for absorbing the counter electromotive force of magnet 46, and is connected between the collector and the emitter of switching transistor 44.

53 is an OP amplifier constituting a head amplifier for the light measurement, a photo voltaic element (SPC) 54 is connected to both of its inputs and logarithmic compression diode 55 is connected in the negative feed back circuit. 56 is a logarithmic expansion transistor, to whose collector a time constant condenser 57 is connected. 58 is a count start switch connected in parallel with condenser 57. 59 is a resistor and 60 is a constant current circuit, the connecting point is connected to the (+) input of comparator 61. The comparators (−) input is connected to the collector of logarithmic expansion transistor 56. 62 is a 2 input OR gate, one input of which is connected to the output of the above comparator 61 and the other input is connected to the PUC signal. The output of OR gate 62 is connected to the reset terminal R of RS-FF43.

70 and 71 are D-flip-flop circuits (hereinafter called D-FF. The input of D-FF70 is connected to power source Vcc, while the input of D-FF71 is connected to the Q output of D-FF70.

72 is a 2 input NAND gate, to one input the SW2 signal is applied and to the other input the output $\overline{\text{SFOP}}$ of NAND gate 26 is applied via an inverting circuit 73. The output of NAND gate 72 is supplied to the CLEAR terminal CL of the D-FF70 and D-FF71. Further, the CLOCK2 signals to be explained later are applied to the CLOCK terminal of the D-FF70 and D-FF71.

75 and 76 are 2 input NAND gates, one input of 75 is connected to the $\overline{\text{Q}}$ output of D-FF71, while one input of 76 is connected to the output SFOP of inverting circuit 73. The other input of 75 is connected to the output of 76, while the other input of 76 is connected to the output of 75.

77 is a 2 input NAND gate, to one input the $\overline{\text{SW2}}$ signal is applied via the inverting circuit 74 and to the other input the output NA3 of NAND gate 74 is applied. 78 is an inverting circuit connected to the output of NAND gate 77, whereby NAND gates 77 and 78 produce the $\overline{\text{2ADSW2}}$ and 2NDSW2 signals.

80 is an oscillator circuit, which produces 10 KHz square waves, CLOCK1. 81 is a frequency dividing circuit with 12 steps, which produces 2.5 Hz square waves, CLOCK2. 82 and 82' are standard voltage circuits, which produce the standard voltage VREF for light measuring head amplifier 53 and the standard level KVC for other circuits. 83 is a self-timer switch to be closed so as to produce a self-timer signal $\overline{\text{SELF}}$ when the self-timer photographing circuit is used.

84 is an inverting circuit connected to the $\overline{\text{SELF}}$ signal for producing a SELF signal. 91 and 92 are the voltage dividing resistors connected between the power source Vcc and the ground, 90 is a condenser connected in parallel with a resistor 92, and 93 is an NPN transistor, the base of which is connected to the voltage dividing point of resistors 91 and 92. 94 is the collector resistor of transistor 93. 95 is an inverting circuit connected to the collector (PUC signal) of transistor 93 for producing a $\overline{\text{PUC}}$ signal.

84' is the power source battery; 89 is the switching transistor for latching the power source; 87 is a switch SW1 in operative engagement with the shutter button; 85 is a resistor connected between SW1 and the base of switching transistor 89; and 88 is an RS-FF, the output $\overline{\text{Q}}$ of which is connected to the base of switching transistor 89 via resistor 86 and to whose set terminal the SW2 signal is applied and to whose reset terminal the PUC signal and the AECUP signal are applied via OR gate 96.

Figure 2A:
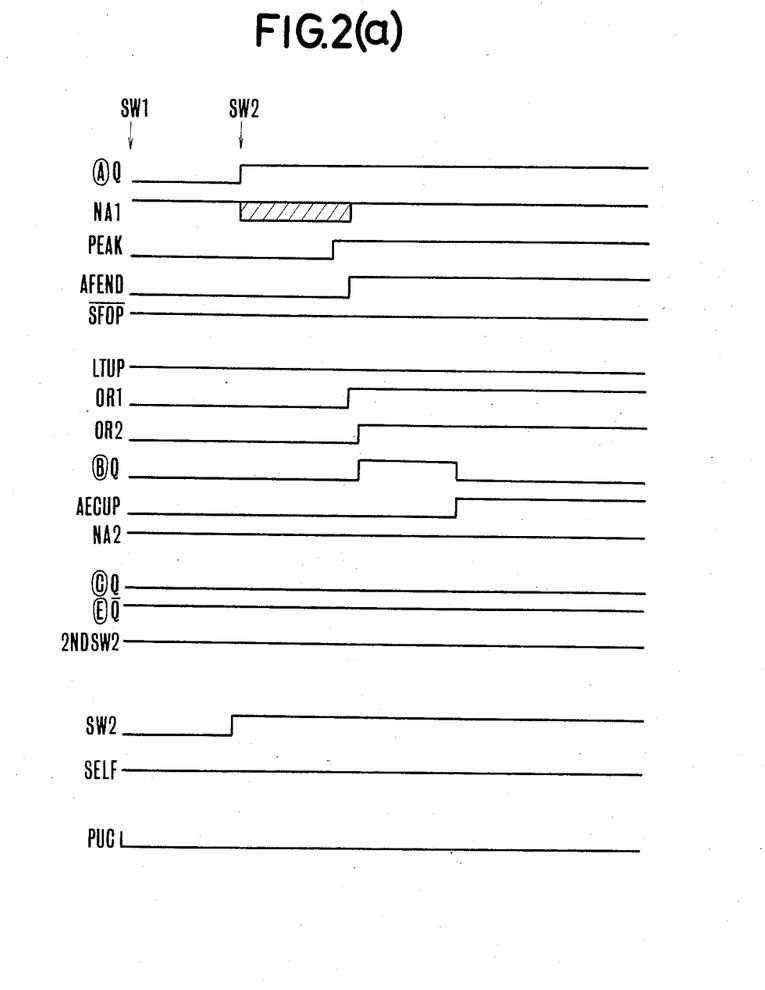
FIG. 2(a) is a drawing for explaining the operation of the circuit in FIG. 1 in the normal photographing mode.

The operation of the above circuit will be explained in accordance with the timing chart in FIG. 2(a).

First, photographing without using the self-timer will be explained.

Because at this time, the self-timer switch 83 is opened, the $\overline{\text{SELF}}$ signal is on the high level (hereinafter called "H level"), while the SELF signal is on the low level (hereinafter called "L level").

When switch SW1 is closed by the first stroke of the shutter button, a base current flows through switching transistor 89 in order to hold the power source via resistor 85 to bring the switching transistor 89 into the on state, when the current is supplied from the (+) power source Vcc to every circuit. Condenser 90 is thus charged via resistor 91 until the charge level reaches a certain determined value. Then, transistor 93 is brought into the on state, whereby the collector voltage (PUC signal) is inverted to the L level. When the power source is switched on, one pulse is produced at the PUC terminal so as to reset RS-FF88, whose Q output is inverted to the H level. Further, with this PUC signal RS-FF12 and 43 are reset, and PEAK detecting circuit 23 and AFEND signal producing circuit 24 are reset to the initial state.

When the shutter is released by the second stroke of the release button, switch SW2 is closed. Thus, RS-FF12 is set, whereby the Q output is inverted to the H level.

Further, RS-FF88 is set, its $\overline{\text{Q}}$ output is inverted to the L level and switching transistor 89 is kept in the on state so as to latch the power source.

Because the in-focus signal producing circuit 24 is in the initial state, as mentioned above, the $\overline{\text{AFEND}}$ signal is at the L level so the AFEND signal is at the H level. Further, because the CLOCK 1 signal is a 10 KHz square wave, square waves of 10 KHz are delivered from the output NA1 of NAND gate 13, whereby transistor 14 is brought to the on and off states accordingly. When the transistor is off, the iRED is driven with a voltage, determined by KUC and voltage dividing resistors 18 and 19, by means of the negative feed back effect of OP amplifier 15, and emits light. On the other hand, when transistor 14 is on, the output of OP amplifier 15 is at the H level, so driving transistor 16 is brought to the off state and the iRED stops emitting light. Thus, iRED17 flickers at 10 KHz.

Further, in synchronization with the closing of switch SW2 the lens barrel is advanced, whereby iRED17 is moved with the scanning member in operative engagement with the above stated advance and the light beam from the iRED scans the object. Thus, the infrared light reflected from the object is incident upon the light sensing element 20, the output of which is amplified by amplifier 21. The amplified signal is detected, with the CLOCK 1 signal, in PEAK detecting circuit 23, which produces an H level signal when a peak takes place in the detected signal. After the lapse of a determined time, after the peak signal has been produced, AFEND signal producing circuit 24 delivers the AFEND signal (H level signal).

When the AFEND signal is sent, current supply to the AF magnet is interrupted by the operation of the AF magnet driving circuit 25 and the lens barrel stops moving. Because the AFEND signal is produced at the in focus time point, the lens barrel is set in the in focus position. Further, because the SELF signal is on the L level when the AFEND signal is produced, the output $\overline{\text{SFOP}}$ of NAND gate 26 remains on the H level. Because the $\overline{\text{SELF}}$ signal is on the H level, the output AN1 of AND gate 31 is inverted to the H level so that the output OR1 of the OR gate 33 is inverted to the H level. Consequently, the output OR2 of OR gate 40 is inverted to the H level after a lapse of a time determined by resistor 34 and condenser 35. With this inversion the differentiating circuit, consisting of the resistor 42 and the condenser 41, produces a positive pulse so as to set RS-FF43 in the next step, so the Q output of RS-FF43 is inverted to the H level. Then, switching transistor 44 is brought to the on state so as to start to supply current to the shutter control magnet 46 to allow the shutter to open.

When the shutter opening operation starts, the auxiliary diaphragm 52, representing the aperture corresponding to the shutter aperture, gradually opens in operative engagement with the shutter member in such a manner that the light is incident upon the light sensing element 54 in accordance with the aperture value. Accordingly, OP amplifier 53 produces a voltage corresponding to the logarithm of the incident light valve. The collector current of expansion transistor 56 then corresponds to the expanded value of the output voltage of operational amplifier 53. Because count start switch 58 opens when the shutter starts to open, the time constant condenser 57 is charged with the above collector current.

When the charge level of the time constant condenser 57 reaches a certain determined value, the output AECUP of the comparator 61 is inverted to the level and the output of OR gate 62 also is inverted to the H level. Therefore, RS-FF43 is reset and the Q output is inverted to the L level. Thus, the switching transistor 44 is brought to the off state so as to interrupt the current supply to the shutter control magnet 46 and the shutter member starts the shutter closing operation.

When the output of comparator 61 is inverted to the H level and the AECUP signal is produced, RS-FF88 is reset and its $\overline{Q}$ output is inverted to the H level. Consequently, if the release button is now freed and switch SW2 is opened, switching transistor 89 for holding the power source is brought to the off state and the power source latch is released.

Figure 2B:
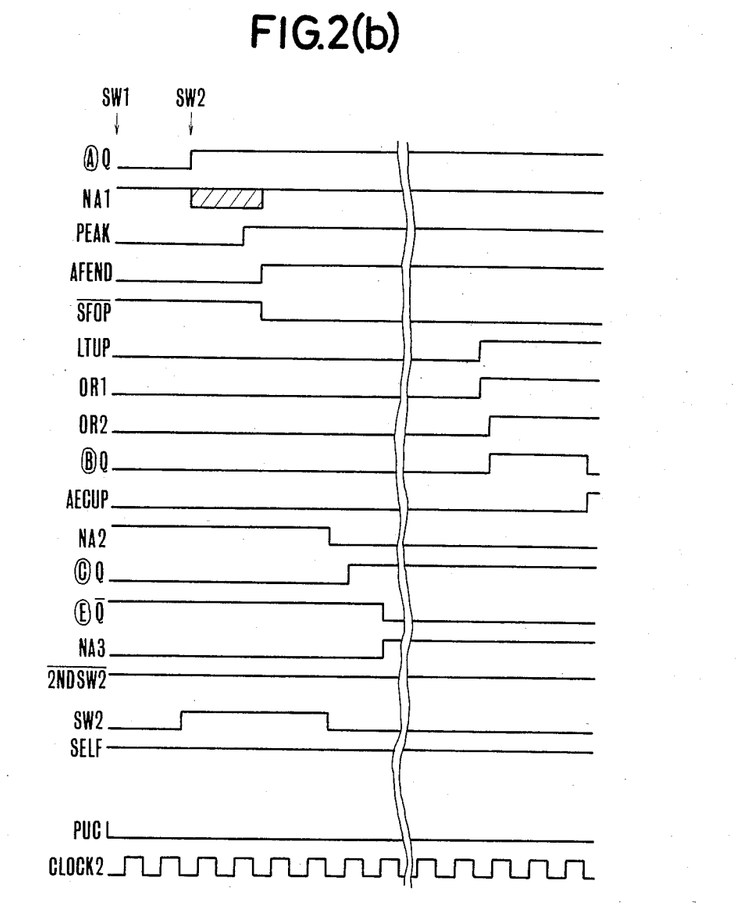
FIGS. 2(b), (c) and (d) are drawings for explaining the operation of the circuit in FIG. 1 in the self-timer photographing mode.

The operation of normal self-timer photographing will be explained in accordance with the timing chart of FIG. 2(b). Because at this time, the self-timer switch 83 is closed, the $\overline{\text{SELF}}$ signal is at the L level, while SELF signal is at the H level.

In this state, depressing the shutter button down to the first stroke closes SW1 and current is supplied to every circuit. When SW2 is closed with the second stroke the lens barrel is advanced, iRED17 lights up, the AF distance measuring operation is carried out and the AFEND signal is produced by the AFEND signal producing circuit 24 at the in focus time. These operations are same as those of non-self-timing photographing. However, in the self-timer mode switch 83 is closed and the $\overline{\text{SELF}}$ signal is on the L level. Thus, even if the AFEND signal is produced the output AN1 of AND gate 31 remains at the L level and the shutter opening operation is not carried out.

On the other hand, because switch 83 is closed, the SELF signal is at the H level and $\overline{\text{2NDSW2}}$ is also at the H level, thus NAND gate 26 produces a L level signal because of the AFEND signal. The output $\overline{\text{SFOP}}$ of NAND gate 26 remains at the H level until the AFEND signal comes to the H level. Thus, inverting circuit 73 delivers an L level signal until the AFEND signal is produced, whereby the outputs of NAND gates 72 and 76 are at the H level. Thus, an H level signal is applied to clear terminal CL of D-FF70 and 71, whose $\overline{Q}$ output is at the H level, while an H level signal is applied to both input terminals of NAND gate 75, whose NA3 output is at the L level. Thus, NAND gate 77 delivers the H level, while the $\overline{\text{2NDSW2}}$ signal is at the H level.

Because the SELF and the $\overline{\text{2NDSW2}}$ signals are at the H level in the self-timer mode, the output of NAND gate 26 is inverted to the L level in response to the AFEND signal so as to bring switching transistor 27 into the off state. By this action condenser 29 is charged with the output of constant current circuit 28.

When the charge level reaches a certain predetermined value, the output LTUP of comparator 30 is inverted to the H level. The time from the start of condenser 29's charging till the output of compararator 30 is inverted to the H level (namely the self-timer time) is set about 10 seconds, the output OR1 of OR gate 33 is also inverted to the H level and the RS-FF43 is set in the same way as in the case of non-self-timer photography. Hereby, the Q output of RS-FF43 is inverted to the H level, a current is supplied to the shutter control magnet 46 and the shutter opening operation starts.

When the shutter opening operation starts, the light measuring and time constant circuits operate in the same way as in case of non-self-timer photographing and the output of comparator 61 is inverted to the H level so as to produce the AECUP signal. The current supply to shutter control magnet 46 is interrupted so as to start the shutter closing operation, while the latch of the power source with the transistor 89 is released.

Further, when the AFEND signal, the output $\overline{\text{SFOP}}$ of NAND gate 26, is inverted to the L level, the output SFOP of the inverting circuit 73 is inverted to the H level and the L level signal applied to the input terminal of NAND gate 72 changes to H level. If at this time, the release button is not freed, an L level signal is applied to the other input terminal of NAND gate 72 because switch SW2 remains closed, so that the output of NAND gate 72 is kept at the H level. Thus, D-FF70 and 71 are kept in the cleared state, while NAND gate 77 remains at the H level. Thus, because the $\overline{\text{2NDSW2}}$ signal continues to be at the H level after the AFEND signal is produced, there are no problems even if the output $\overline{SFOP}$ of NAND gate 26 is inverted out of the H level to the L level with the AFEND signal and the SFOP signal applied to the one input terminal of NAND gate 72 is inverted out of the L level to the H level.

Further, when the release button is freed during the self-timing switch SW2 is opened, while as mentioned above the output $\overline{SFOP}$ signal of NAND gate 26 is inverted to the L level by the AFEND signal and the SFOP signal is inverted into the H level by the inverting circuit 73 so that the output of NAND gate 72 is inverted to the L level thereby releasing D-FF70 and 71 from the cleared state. Thus, in this case D-FF70 and 71 are set in synchronization with the CLOCK2 (2.5 Hz) and the $\overline{Q}$ output of D-FF71 is inverted to the L level, after one cycle of CLOCK2 which cycle begins after the release button is freed, so as to invert output NA3 of NAND gate 75 to the H level. Because switch SW2 is opened, the L level signal is, however, applied to NAND gate 77 via the inverting circuit 74. The $\overline{2NDSW2}$ signal is kept at the H level in this case also. Thus, the self-timing operation is carried out normally in this case.

Figure 2C:
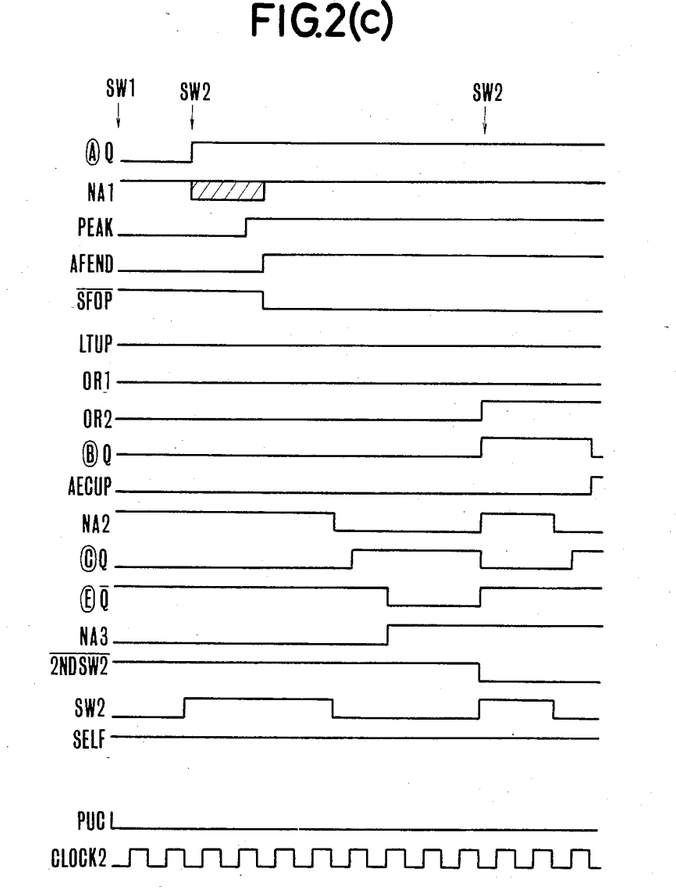

The case where the release button is freed, while the self-timing operation is being carried out with the second stroke of the release button, and is then depressed again so as to release the shutter immediately during the self-timing operation will be explained in accordance with FIG. 2(c).

Let us suppose that as mentioned above, that the self-timer mode is selected, the second stroke of the shutter button is carried out and the self-timing operation is carried out. When in this state the release button is freed, D-FF70 and 71 are released from the cleared state and output $\overline{Q}$ of D-FF71 is inverted to the L level after one cycle of CLOCK2 whereby the output NA3 of NAND gate 75 is inverted to the H level.

When the shutter button is depressed again, down to the second stroke, switch SW2 is closed and the output of inverting circuit 74 is inverted to the H level. Consequently, the output $\overline{2NDSW2}$ of NAND gate 77 is at the L level and the cutput of NAND gate 26 is inverted thereby terminating the self-timing operation.

Further, along with the inversion of the $\overline{2NDSW2}$ signal to the L level, the output $\overline{2NDSW2}$ signal of inverting circuit 78 is inverted to the H level and the output OR2 of OR gate 40 is applied to the differentiating circuit. This sets RS-FF 43 as mentioned above so that the shutter opening operation is carried out. In accordance with the present invention, operating the shutter button for a second time during the self-timing operation, will cause the photographing operation to be immediately carried out.

Figure 2D:
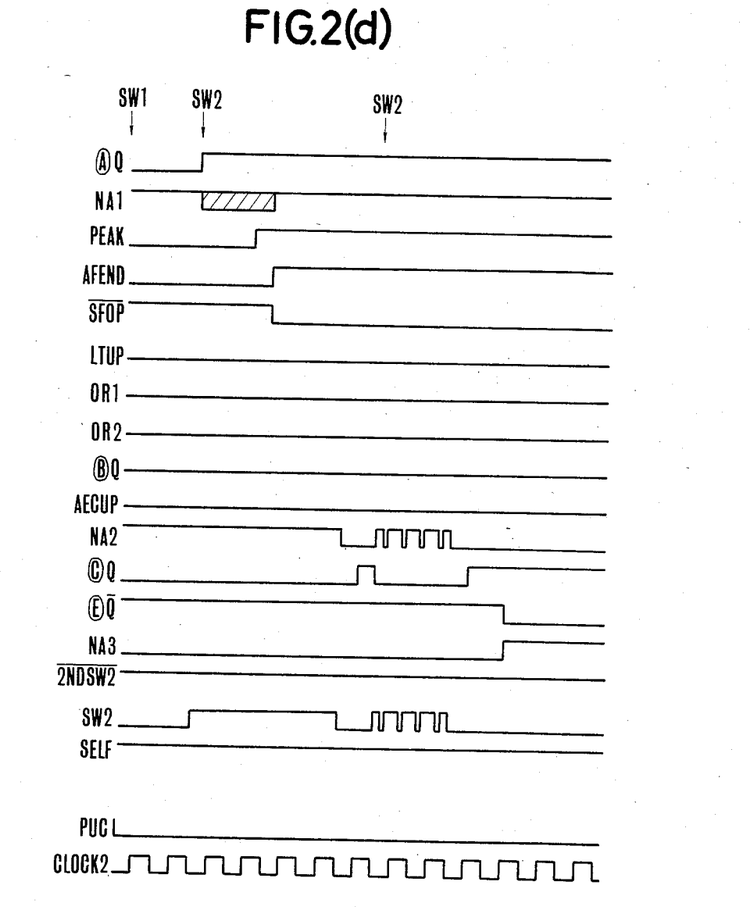

The case where switch SW2 is opened after the release button is freed and the release button is depressed again during the self timing operation will be explained in accordance with FIG. 2(d).

Now, let us suppose that the self-timing operation is carried out with the first depression of the release button and that switch SW2 is then opened, the release button being freed. Thus, as mentioned above D-FF70 and 71 are released from the cleared state and the $\overline{Q}$ output of D-FF71 is inverted to the L level after one cycle of the CLOCK2, whereby, within the cycle, the $\overline{Q}$ output of D-FF71 is kept at the H level. Consequently, even if the shutter button is depressed again within the cycle, switch SW2 is closed again and the H level signal is applied to NAND gate 77 via the inverting circuit 74, and the $\overline{Q}$ output of D-FF71 is at the H level within the cycle so that NAND gate 75 is kept on the L level. Because of this the $\overline{2NDSW2}$ output signal of NAND gate 77 is kept at the H level. Further, along with the closing of switch SW2 NAND gate 72 delivers an H level signal so as to bring D-FF70 and 71 to the cleared state again. Consequently, the output of NAND gate 75 is kept at the L level, while the output of NAND gate 77 is kept at the H level. Thus, in this case the shutter release operation is not carried out even if the shutter button is depressed again and the normal self-timer operation is carried out.

As explained above, in accordance with the present invention, the release operation is not carried out when the time between the opening and the closing of switch SW2 is short, even if switch SW2 is closed during the self-timing operation. Therefore, misoperation of the shutter release due to chattering of switch SW2 when the shutter button is freed can be avoided.

In the case of the release device of the present invention, the shutter release operation is immediately carried out with the depression of the shutter button during the self-timing operation so that, when compared with the conventional device, it is remarkably convenient for the taking of snapshots, which is very profitable.

What we claim:

1. A shutter release device comprising:
    (a) a shutter release switch having a first state and a second state, and rendering a releasing operation to be carried out in said second state;
    (b) self-timer mode setting means;
    (c) a self-timer circuit arranged to initiate a time measuring operation with change of said shutter release switch from a first state to a second state after the setting of the self-timer mode by said self-timer mode setting means, and upon termination of the time measuring operation, to produce a release signal;
    (d) detecting means for electrically detecting that, after the self-timer mode has been set by said self-timer mode setting means, said shutter release switch has been twice changed over from the first state to the second state;
    (e) shutter release operation means for carrying out a shutter release operation in response to a shutter release signal; and
    (f) a release signal forming circuit for forming a shutter release signal when said detecting means detects the fact that after the self-timer mode has been set by said self-timer mode setting means, said shutter release switch has been twice changed over from the first state to the second state.

2. A shutter release device according to claim 1, wherein the timer circuit is made non-operative in response to the shutter release signal.

3. A shutter release device according to claim 1, further comprising:
    (a) prohibiting means for making release signal forming means non-operative during a certain determined time after the release switch has been changed over from the first state to the second state, whereby only if the time from the release operation switch has been changed over from the first state to the second state until the time the switch is changed over from the first state to the second state again during the self-timing operation is longer than a certain determined one, is the shutter release signal formed to operate the shutter release operation means and carry out the shutter release operation.

4. A shutter release device according to claim 3, wherein said certain determined time is provided by taking into account the chattering time of said switch means.

5. A shutter release device according to claim 1, further comprising:
 (a) an auto focus device for carrying out auto focus operation; and
 (b) prohibit means for making said release signal forming means non-operative until said auto focus device has carried out auto focus operation.

6. A shutter release device according to claim 1, wherein said detecting means becomes ready to operate when said shutter release switch has, for the first time, been changed over from the first state to the second state and is changed from the second state to the first state, and then operates to detect electrically the fact that said shutter release switch changes over again from the first state to the second state.

7. A camera having a self-timer photo-taking mode, comprising:
 (a) release operation means for carrying out a shutter release operation in response to a release signal;
 (b) a release switch having a first state and a second state to carry out the release operation in its second state;
 (c) a time counting circuit for carrying out the time counting process for a prescribed period of time in a self-timer photo-taking mode and for producing a signal after the completion of the time counting;
 (d) a detection circuit to detect that the release switch has changed over from the first state to the second state in the self-timer photo-taking mode and for producing a signal; and
 (e) an OR gate for producing a logical sum of the signal from the time counting circuit and the signal from the detection circuit as the release signal.

8. A camera according to claim 7, further comprising:
 (a) auto focus means for focusing an objective lens of a camera; and
 (b) prohibition means for prohibiting generation of said release signal until said time counting circuit counts at least a time for completion of the opertion of said focqs means.

9. A camera having a self-timer photo-taking mode, comprising:
 (a) release operation means for carrying out a shutter release operation in response to a release signal;
 (b) a release switch having a first state and a second state to qarry out the release operation in its second state;
 (c) a time counting circuit for carrying out the time counting process for a prescribed period of time in a self-timer photo-taking mode and for producing a signal after the completion of the time counting;
 (d) a detection circuit to detect that the release switch has changed over from the first state to the second state in the self-timcr photo-taking mode and for producing a signal; and
 (e) a logic gate circuit for producing a logical sum of the signal from the time counting circuit and the signal from the detection circuit as the release signal.

10. A camera according to claim 9, further comprising:
 (a) auto focus means for focusing an objective lens of a camera; and
 (b) prohibition means for prohibiting generation of said release signal until said time counting circuit counts at least a time for completion of the operation of said focus means.

11. A camera having a self-timer photo-taking mode, comprising:
 (a) release operation means for carrying out a shutter release operation in response to a release signal;
 (b) a release switch having a first state and a second state to carry out the release operation in its second state;
 (c) a time forming circuit for carrying out the time forming process for a prescribed period of time in a self-timer photo-taking mode and producing a signal after the completion of the time counting;
 (d) a detection circuit to detect that the release switch has changed over the first state to the second state during the time forming process and for producing a signal; and
 (e) a logic circuit for producing a logical sum of the signal from the time forming circuit and the signal from the detection circuit as the release signal.

12. A camera having a self-timer photo-taking mode, comprising:
 (a) release operation means for carrying out a shutter release operation in response to a release signal;
 (b) a release switch having a first state and a second state to carry out the release operation in its second state;
 (c) a time forming circuit for carrying out the time forming process for a prescribed period of time in a self-timer photo-taking mode and producing a signal after the completion of the time counting; and
 (d) a detection circuit to detect that the release switch has changed over the first state to the second state during the time forming process and for producing a signal as the release signal.

* * * * *